(12) United States Patent
Esmailzadeh

(10) Patent No.: US 7,805,167 B1
(45) Date of Patent: Sep. 28, 2010

(54) TELECOMMUNICATIONS SYSTEM, BASE STATION THEREOF AND TELECOMMUNICATIONS METHOD

(75) Inventor: Riaz Esmailzadeh, Yokohama (JP)

(73) Assignee: Telefonaktiebolaget LM ERicsson (publ), Stockholm (SE)

( * ) Notice: Subject to any disclaimer, the term of this patent is extended or adjusted under 35 U.S.C. 154(b) by 0 days.

(21) Appl. No.: 09/525,901

(22) Filed: Mar. 15, 2000

(30) Foreign Application Priority Data

Mar. 16, 1999 (JP) ................................. 11-070130

(51) Int. Cl.
*H04B 1/38* (2006.01)

(52) U.S. Cl. .................. 455/562.1; 455/452.1; 455/518

(58) Field of Classification Search .............. 455/562.1, 455/452, 453, 463, 518, 519, 561, 431, 452.1, 455/452.2
See application file for complete search history.

(56) References Cited

U.S. PATENT DOCUMENTS

| | | | |
|---|---|---|---|
| 5,615,409 A | 3/1997 | Forssen et al. ................. 455/59 |
| 5,649,287 A | 7/1997 | Forssen et al. ................. 455/59 |
| 5,742,639 A * | 4/1998 | Fasulo, II et al. ........... 375/219 |
| 5,781,845 A | 7/1998 | Dybdal et al. ................. 455/65 |
| 6,018,659 A * | 1/2000 | Ayyagari et al. ............ 455/431 |
| 6,023,625 A * | 2/2000 | Myeres, Jr. ................. 455/503 |
| 6,085,101 A * | 7/2000 | Jain et al. .................... 455/500 |
| 6,128,472 A * | 10/2000 | Harel et al. ................. 455/31.3 |

FOREIGN PATENT DOCUMENTS

WO WO97/00543 1/1997

OTHER PUBLICATIONS

Barry D. Van Veen et al. "Beamforming: A Versatile Approach to Spatial Filtering", IEEE ASSP Magazine, pp. 4-24, Apr. 1988.

* cited by examiner

*Primary Examiner*—Edward F. Urban
*Assistant Examiner*—Thuant Nguyen

(57) ABSTRACT

A wireless telecommunications system capable of transmitting desired information to a plurality of mobile stations efficiently is adapted to transmit the information to the plurality of mobile stations by forming a signal beam that covers these mobile stations simultaneously. Since information can thus be sent to a plurality of mobile stations at the same time, it is possible to send information in a highly efficient. In addition, because transmission power can be reduced, interference acting upon other mobile stations can be suppressed.

10 Claims, 8 Drawing Sheets

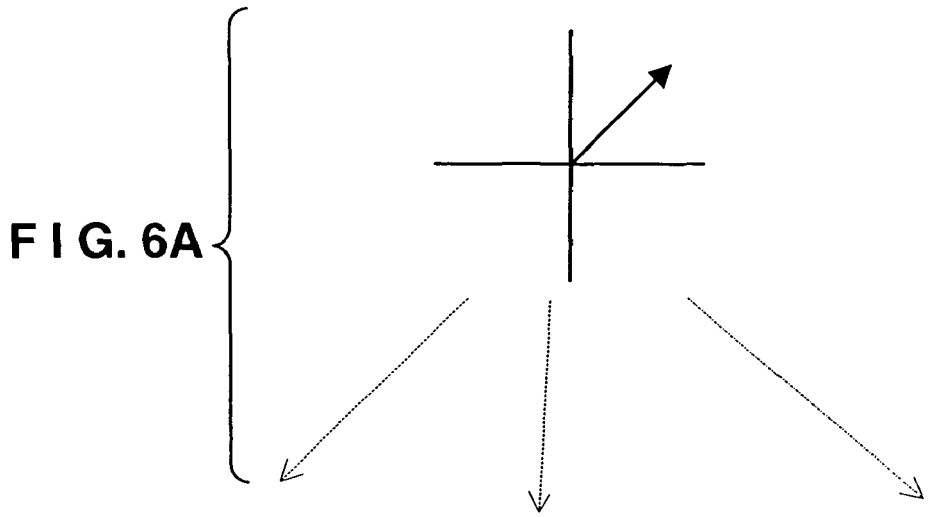
F I G. 6A
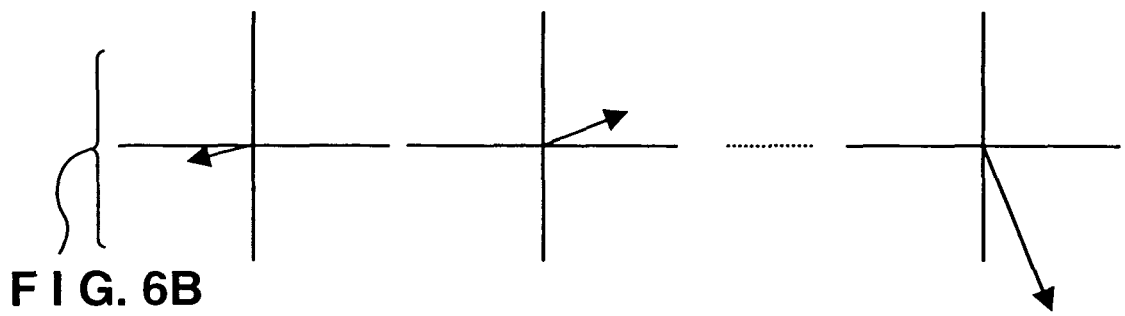
F I G. 6B
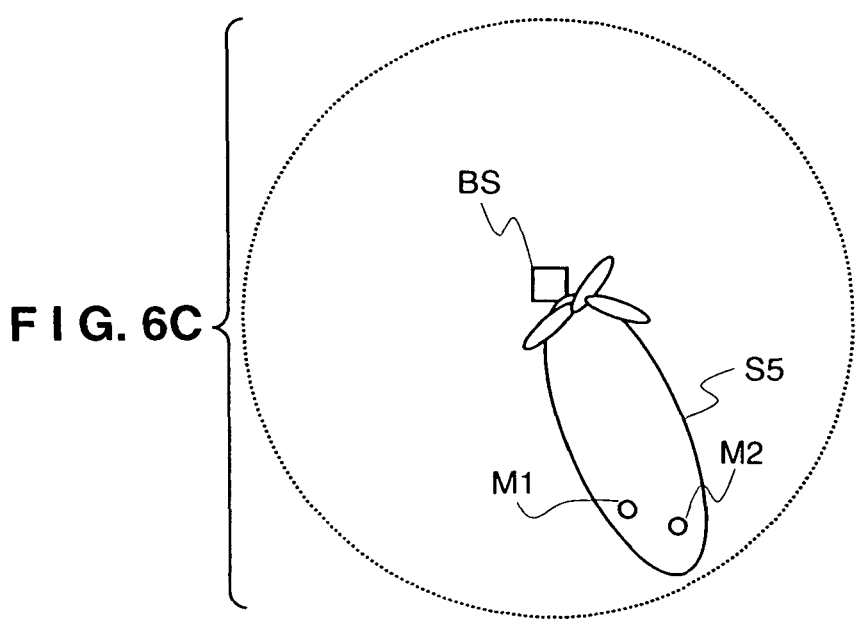
F I G. 6C

TELECOMMUNICATIONS SYSTEM, BASE STATION THEREOF AND TELECOMMUNICATIONS METHOD

FIELD OF THE INVENTION

This invention relates to a wireless telecommunications system in which it is possible to transmit desired information to a plurality of mobile stations in an efficient manner.

BACKGROUND OF THE INVENTION

Great strides in wireless telecommunications techniques have been made in recent years and this has been accompanied by the implementation and practical use of various wireless communications systems. A mobile radiotelephone system or so-called cellular phone system best typifies such wireless telecommunications systems.

Various wireless telecommunications schemes have been proposed for such mobile radiotelephone systems. For example, FDMA (Frequency Division Multiple Access) is currently being employed in analog mobile radiotelephone systems. According to the FDMA scheme, a single communication channel is allocated to a single radio frequency and communication channels used by respective ones of a plurality of users are set to different radio frequencies on a per-user basis.

TDMA (Time-Division Multiple Access) is currently being employed in digital mobile radiotelephone systems, which have rapidly come into widespread use in recent years. With TDMA, a single radio frequency is divided up into a plurality of time slots and signals are transmitted at the timings of time slots that have been allocated to the local station, whereby three or six communication channels, for example, are formed on one radio frequency. In accordance with this scheme, a plurality of communication channels can be formed on a single radio frequency, as a result of which the capacity of the system can be enlarged over that of the analog scheme.

CDMA (Code-Division Multiple Access) has recently been proposed as a communications scheme for the next-generation of mobile radiotelephone systems. With CDMA, the same radio frequency band is shared simultaneously by a plurality of users. At the time of transmission, transmitted data is multiplied by spreading codes that differ for each user, thereby forming a plurality of channels on the same frequency. Since this scheme makes it possible for the same frequency band to be used by all cells of a cellular system, the system capacity can be increased further over that of the TDMA scheme. For this reason, CDMA is currently the focus of interest in regard to its application to the next-generation of mobile communications.

Since a mobile radiotelephone systems using CDMA is such that common use is made of the same frequency, a situation arises in which a signal transmitted by a certain user acts upon another user as interference. This is an important problem encountered when constructing the communications system. Accordingly, a variety of expedients for reducing interference waves in CDMA communications system have been devised. One is the usage of an adaptive array antenna. An adaptive array antenna increases system capacity by reducing interference waves inflicted upon other users.

An adaptive array antenna is composed of a plurality of antenna elements. When the amplitudes and phases of signals to be transmitted are adjusted and the signals are then supplied to respective ones of the antenna elements, the signals sent from the antenna elements are combined and, as a result, a signal beam of a radio signal is formed in a prescribed direction, as illustrated in FIG. 7. Since a signal S1 is thus capable of being transmitted almost solely in the direction of a mobile station M1, it is possible to prevent the transmitted signal S1 from acting upon a mobile station M2 as interference.

The number of array elements in an adaptive array antenna is decided depending upon the extent to which a signal beam is to be concentrated on a specific user, the extent to which signals are to be isolated and the degree to which mutual interference between users is to be reduced. An adaptive array antenna of this kind is disclosed in detail in IEEE ASSP Magazine, pp. 4-24, April 1988; Barry D. van Veen and Keven Buckley: "Beamforming: A versatile approach to spatial filtering".

There is demand for various functions other than a voice function, and particularly intense demand for a multicast function, in next-generation mobile radiotelephone systems. A multicast function is a function for transmitting the same information from a base station to a plurality of mobile stations simultaneously. A specific example of a service that relies upon the multicast function is the simultaneous transmission of information (referred to as "multicast data" below) such as traffic information, weather information and stock-market information to a plurality of contract users.

If an attempt is made to implement such a multicast function using a CDMA mobile radiotelephone system, a conceivable approach is to form signal beams S1 and S2 individually in the directions of contract mobile stations M1 and M2 using an adaptive array antenna in a manner similar to that of ordinary individual communication, and transmit the multicast data individually by these signal beams S1, S2, as shown in FIG. 8.

With this method, however, the multicast data is transmitted upon forming the signal beams S1, S2 individually for the mobile stations M1, M2 of the contracting parties. This is inefficient in terms of multicasting. Further, the multicast data is transmitted separately to the mobile stations M1, M2. This also is inefficient in terms of transmission power. Thus, inefficiencies remain in regard to the transmission of multicast data and there seems to be room for improvement.

SUMMARY OF THE INVENTION

Accordingly, an object of the present invention is to provide a wireless telecommunications system and method in which desired information can be transmitted efficiently to a plurality of mobile stations.

According to the present invention, the foregoing object is attained by providing a wireless telecommunications system in which a radio link is established between a base station and a mobile station by predetermined wireless communication technique, wherein when the same information is sent to plurality of mobile stations, the base station sends the information by forming a signal beam that covers the plurality of mobile stations simultaneously. By thus sending information by forming a signal beam that covers a plurality of mobile stations simultaneously, the information can be sent to a plurality of mobile stations more efficiently than in a case where information is sent by forming signal beams individually. In addition, transmission power can be reduced to mitigate the influence of interference waves on other mobile stations.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 6A to 6C is a schematic diagram showing the principle in accordance with which a signal beam is formed in a prescribed direction by the adaptive array antenna;

DETAILED DESCRIPTION OF THE PREFERRED EMBODIMENTS

Figure 1:
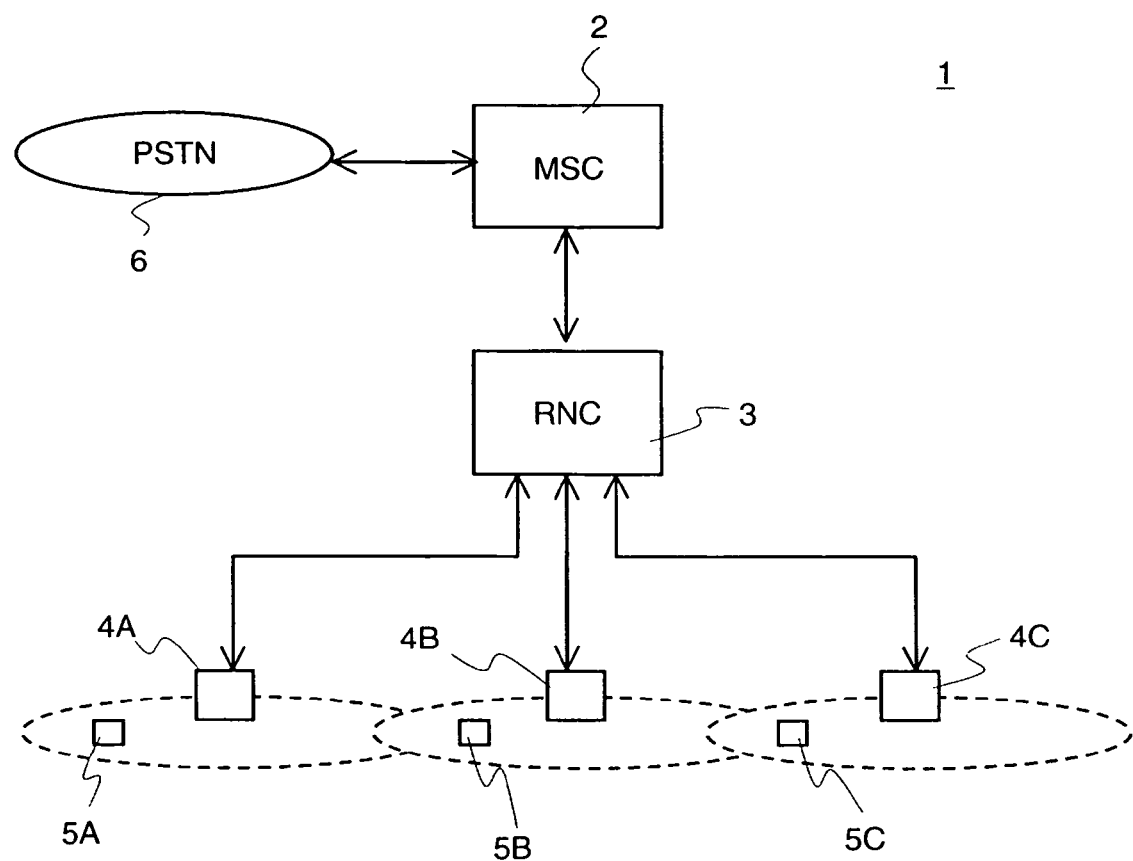
FIG. 1 is a block diagram showing the configuration of a CDMA mobile radiotelephone system to which the present invention has been applied.

FIG. 1 illustrates a CDMA mobile radiotelephone system 1 to which the present invention has been applied. The mobile radiotelephone system 1 includes a mobile services switching center (MSC) 2, a radio network controller (RNC) 3 and a plurality of base stations 4A to 4C. The mobile services switching center 2, which is connected to the radio network controller 3 via a prescribed transmission line, performs call control and registration management, etc., of mobile stations 5A to 5C via the radio network controller 3, and exercises overall control of the system. Further, the mobile services switching center 2 is connected to a public switched telephone network (PSTN) 6 via a prescribed transmission line to relay calls between telephones connected to the PSTN 6 and desired ones of the mobile stations 5A to 5C.

The radio network controller 3, which is a device for controlling a radio network, connects and disconnects the base stations 4A to 4C and mobile stations 5A to 5C, hands over the mobile stations, controls transmission power, etc.

The base stations 4A to 4C are transceivers which, on the basis of control performed by the radio network controller 3, actually establish CDMA radio links with the mobile stations 5A to 5C. This enables the base stations 4A to 4C to communicate with other mobile stations in the system, or with other telephones connected to the PSTN 6, via the base stations 4A to 4C.

Though the three base stations 4A to 4C and three mobile stations 5A to 5C are discussed here for the sake of simplicity, the numbers of these stations are not limited to those of this embodiment. Further, the mobile stations 5A to 5C may be portable telephones whose basic function is the voice function or transportable general-purpose computers, for example, each having a radio interface for interfacing the mobile stations 4A to 4C.

The mobile radiotelephone system 1 has a multicast function in addition to the voice function mentioned above. More specifically, the mobile services switching center 2 is so adapted as to periodically acquire information such as traffic information, weather information and stock-market information from prescribed information sources via the PSTN 6, send this information as multicast data to the base stations 4A to 4C via the radio network controller 3, and send the information to the desired mobile stations 5A to 5C via the base stations 4A to 4C. In such case the multicast data is not sent to all mobile stations but only to mobile stations that have entered into an information-service agreement with a provider of the mobile radiotelephone system 1.

Information as to whether an agreement has been made is stored, in association with the identification number of the mobile station, in the mobile services switching center 2 of the mobile radiotelephone system 1. This makes it possible to send multicast data only to contract users based upon the stored data.

The multicast function will now be described in greater detail.

The mobile services switching center 2 sends multicast data, which has been acquired periodically via the PSTN 6, to the base stations 4A to 4C via the radio network controller 3.

A user wishing to receive multicast data inputs a data receive command to the mobile station 5A (or 5B or 5C) by performing a prescribed operation. Upon receiving the command, the mobile station 5A (or 5B or 5C) transmits a request command for requesting the multicast data. For example, the request command includes mobile station ID information and the type of content desired to be received. The request command is received by the base station 4A (or 4B or 4C), whence the command is sent to the mobile services switching center 2 via the radio network controller 3.

Upon receiving the request command, the mobile services switching center 2 determines, based upon the mobile station ID information, whether the mobile station 5A (or 5B or 5C) that sent the request command is that of a contract user. If the mobile station is a contract user, the mobile services switching center 2 instructs the base station 4A (or 4B or 4C) that received the request command to transmit the multicast data to the mobile station 5A (or 5B or 5C). The base stations 4A-4C each have an adaptive array antenna. The base station 4A (or 4B or 4C) that was instructed to transmit the multicast data uses it adaptive array antenna to form a signal beam that will point only toward the mobile station 5A (or 5B or 5C) desiring the multicast data and transmits the multicast data solely to this mobile station 5A (or 5B or 5C).

It should be noted that a single cell may contain one or a plurality of mobile stations desiring multicast data. In a case where a plurality of mobile stations desiring multicast data reside in one cell, a signal beam that will encompass these plurality of mobile stations simultaneously is formed by the adaptive array antenna to transmit the multicast data to these mobile station at a stroke. Further, the base station 4A (or 4B or 4C) is adapted to transmit the multicast data repeatedly a prescribed number of times in order that the multicast data can be received with certainty at the mobile station 5A (or 5B or 5C).

When a request to receive multicast data is thus generated in the mobile radiotelephone system 1 of the present invention, the multicast data is transmitted to the mobile station. Though a method of transmitting multicast data continuously is conceivable as an approach that contrasts with that of this invention, this would mean transmitting multicast data even when mobile stations desiring such reception are not present within a cell. As a consequence, the signal would act as interference and might have a deleterious effect upon mobile stations participating in ordinary individual communication or mobile stations other than those of contracting parties. In order to avoid this, therefore, the present invention is adapted to transmit multicast data only when there is a request to receive this data.

The construction of the base stations 4A to 4C which transmit a signal beam of multicast data in a prescribed direction will now be described. Since the base stations 4A to 4C basically are identical in construction, only the base station 4A will be described.

Figure 2:
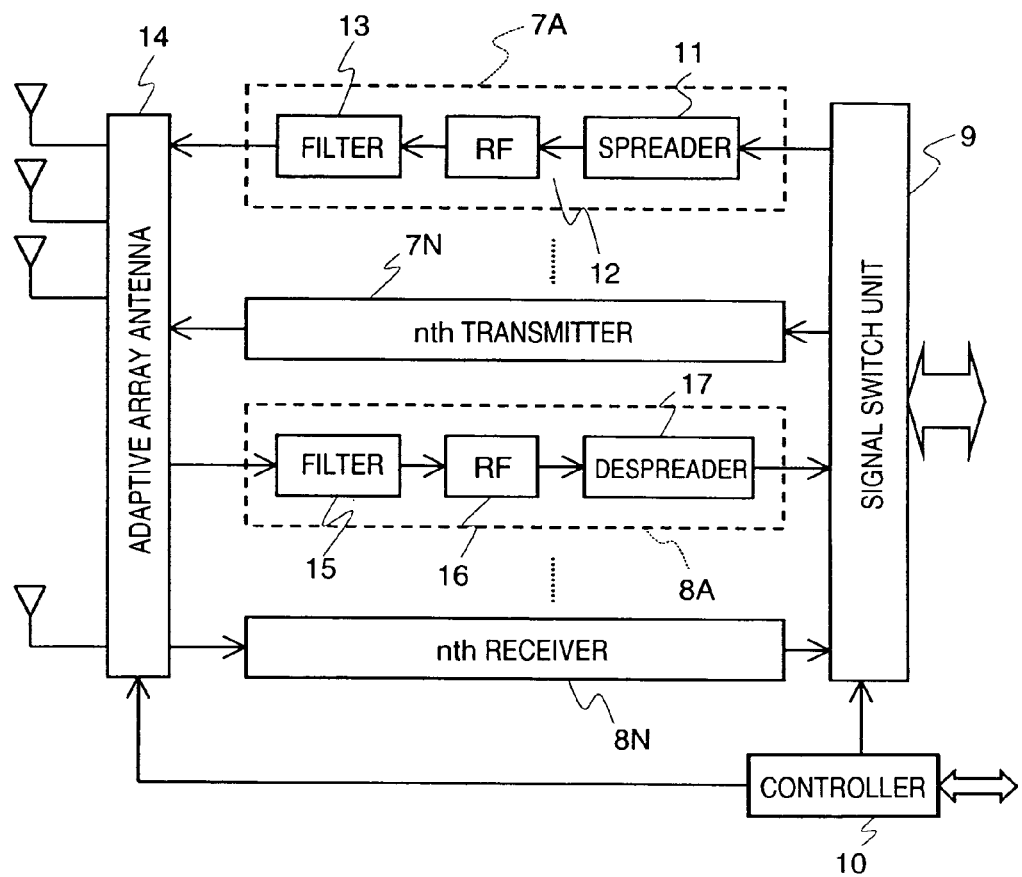
FIG. 2 is a block diagram showing the construction of a base station according to the present invention.

FIG. 2 shows the construction of the base station 4A. It should be noted, however, that a baseband signal processing circuit and an interface circuit for interfacing the radio network controller 3 are not described here.

As shown in FIG. 2, the base station 4A has a plurality of transmitters 7A to 7N and a plurality of receivers 8A to 8N and is adapted so as to be capable of communicating with a plurality of mobile stations simultaneously using these transmitters 7A to 7N and receivers 8A to 8N. Individual transmission data such as voice data sent from the radio network controller 3 is input to a signal switch unit 9 via an interface circuit (not shown).

The signal switch unit 9 comprises a demultiplexer circuit, for example, for assigning input individual transmission data to corresponding ones of the transmitters 7A to 7N. On the assumption that the 1st through nth transmitters 7A to 7N correspond to 1st through nth communication channels, respectively, the signal switch unit 9 sends individual transmission data to the corresponding transmitters 7A to 7N in the following manner: individual transmission data transmitted on the first communication channel is sent to the first transmitter 7A, individual transmission data transmitted on the second communication channel is sent to the second transmitter 7B, and so on.

Control data sent from the radio network controller 3 enters a controller 10 via an interface circuit, which is not shown. The controller 10 receives the control data from the radio network controller 3, controls the operation of the signal switch unit 9 based upon the control data and controls the operation of an adaptive array antenna 14, which is described later.

The 1st through nth transmitters 7A-7N are identically constructed. The first transmitter 7A has a spreading circuit 11 to which the entered individual transmission data is input first. The spreading circuit 11 multiplies the individual transmission data by a predetermined spreading code that has been allocated to the first communication channel, thereby subjecting the individual transmission data to spread-spectrum modulation.

In CDMA communication, communication channels are distinguished from one another by allocating a different spreading code for each channel. On the receiving side, received data is multiplied by a spreading code the same as that on the transmitting side and despread processing is then executed to restore the data.

The transmission signal output by the spreading circuit 11 enters a radio-frequency unit (RF) 12. Here the signal undergoes frequency conversion processing so as to be converted to a transmission signal of a prescribed frequency band. The transmission signal output by the radio-frequency unit 12 enters a filter 13, which eliminates unwanted signal components from the signal and then inputs the resulting signal to the adaptive array antenna 14.

Similarly, the 2nd through nth transmitters 7B-7N also multiply input individual transmission data by respective spreading codes assigned thereto, apply spread-spectrum modulation, then subject the transmission signals to frequency conversion processing and filtering processing and output the resulting signals to the adaptive array antenna 14.

On the basis of control by the controller 10, the adaptive array antenna 14, which has a plurality of antenna elements, controls the amplitude and phase of each of the transmission signals applied to respective ones of the plurality of antenna elements to thereby form signal beams in prescribed directions and transmit each signal. More specifically, the adaptive array antenna 14 controls the amplitude and phase of the transmission signal output by the first transmitter 7A, thereby forming and transmitting a signal beam in the direction of the mobile station that is to receive this transmission signal. Similarly, the adaptive array antenna 14 controls the amplitudes and phases of the transmission signals output by the 2nd to nth transmitters 7B to 7N, thereby forming and transmitting signal beams in the direction of the respective mobile stations that are to receive these transmission signals.

Figure 8:
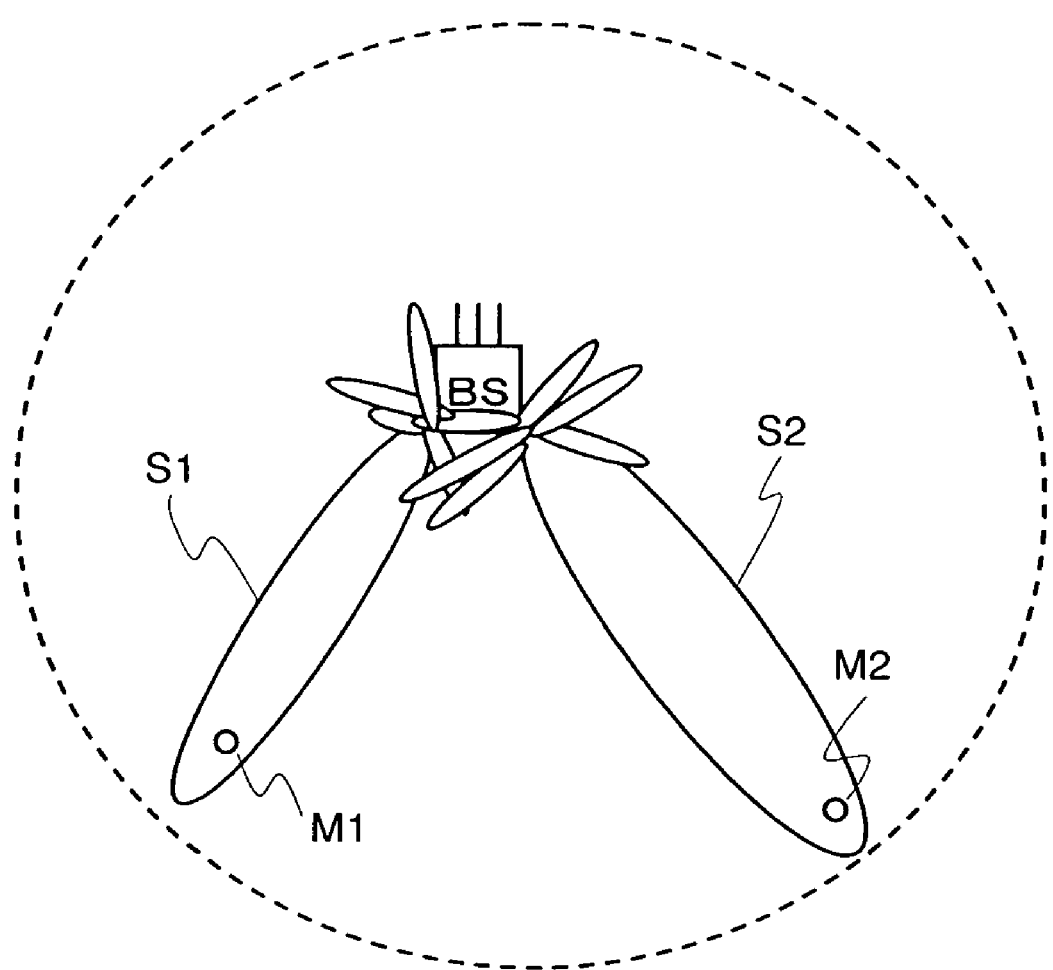
FIG. 8 is a beam waveform diagram useful in describing an instance where multicast data is transmitted individually using the adaptive array antenna.

As a result of the operation described above, the mobile radiotelephone system 1 forms signal beams S1 and S2 pointing toward the mobile stations M1 and M2, as shown in FIG. 8, at the time of individual transmission, and transmits the individual transmission data to the respective mobile stations M1 and M2. Accordingly, the mobile radiotelephone system 1 makes it possible to reduce interference within the system when an individual data transmission is made to each mobile station.

Meanwhile, signals received from the mobile stations by the adaptive array antenna 14 enter the corresponding 1st through nth receivers 8A-8N. The 1st through nth receivers 8A-8N are identically constructed. Each has a filter 15 which eliminates unwanted components from the received signal, a radio-frequency (RF) unit 16 which subsequently extracts the signal component of the baseband, and a despreading circuit 17 for extracting the received data by executing despread processing using a despreading code identical with that on the transmitting side. Each item of received data thus extracted is sent to the radio network controller 3 via the signal switch unit 9 and is then sent to the terminal of the communicating party.

Operation in the case of a multicast data transmission, which differs from the individual data transmission set forth above, will now be described.

Specifically, multicast data sent from the radio network controller 3 enters the signal switch unit 9 via an interface circuit, which is not shown, in a manner similar to the foregoing. On the basis of control exercised by the controller 10, the signal switch unit 9 supplies the multicast data solely to, e.g., the transmitter 7A. In a manner similar to that when an individual transmission is made, the transmitter 7A applies spread-spectrum modulation to the multicast data, then executes frequency conversion processing to generate a transmission signal and outputs this signal to the adaptive array antenna 14.

In a case where only one mobile station that is to receive the multicast data resides in a cell, the adaptive array antenna 14, based upon control by the controller 10, adjusts the amplitude and phase of the multicast data transmission signal and supplies the resulting signal to each antenna element, thereby forming a signal beam directed toward this mobile station and transmitting the multicast data transmission signal using this signal beam.

Figure 3:
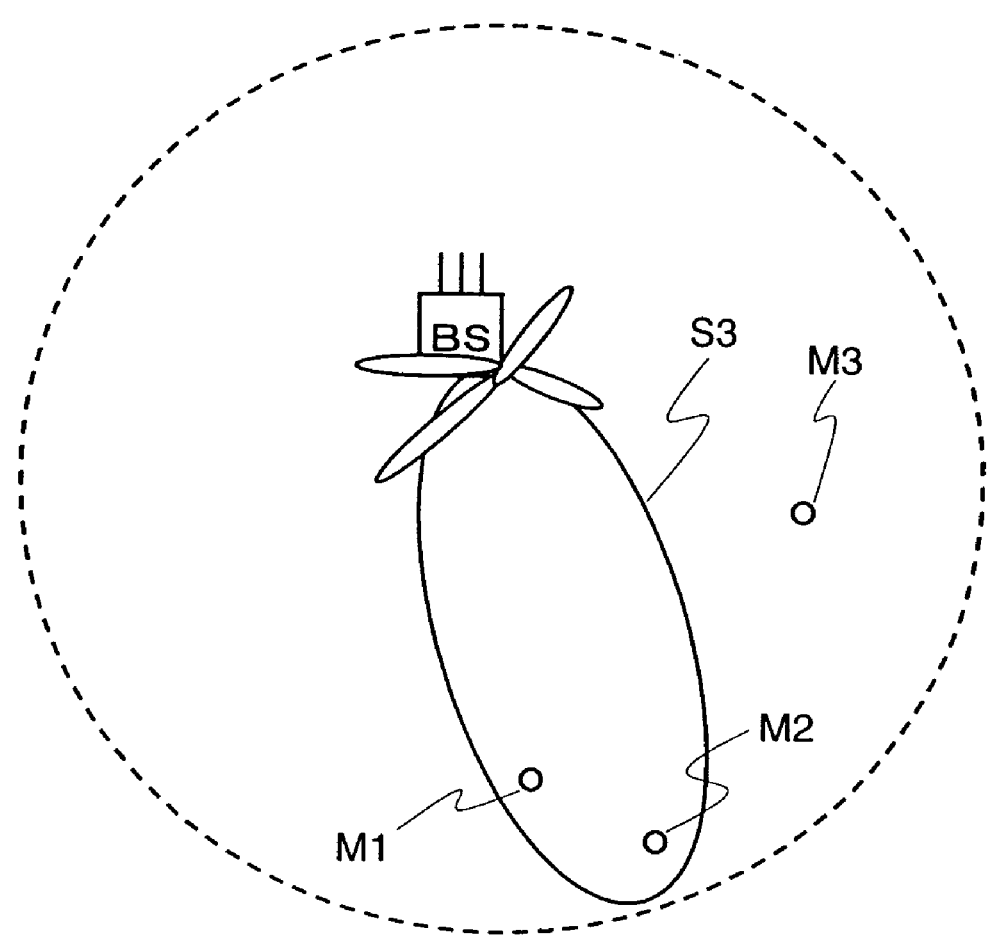
FIG. 3 is a beam waveform diagram useful in describing a signal beam that covers a plurality of mobile stations.

In a case where a plurality of mobile stations that wish to receive the multicast data reside in a cell, the adaptive array antenna 14, based upon control by the controller 10, adjusts the amplitude and phase of the multicast data transmission signal and supplies the resulting signal to each antenna element, thereby forming a signal beam S3 that simultaneously covers the plurality of mobile stations M1, M2 desiring to receive the multicast data, as depicted in FIG. 3, and transmitting the multicast data. Thus, when multicast data is transmitted to the plurality of mobile stations M1, M2, the mobile radiotelephone system 1 transmits the signal to the plurality of mobile stations M1, M2 at one time. This makes it possible to reduce the power of transmission within the cell and, as a result, to reduce interference that acts upon the other mobile station M3 present in the cell.

Figure 4:
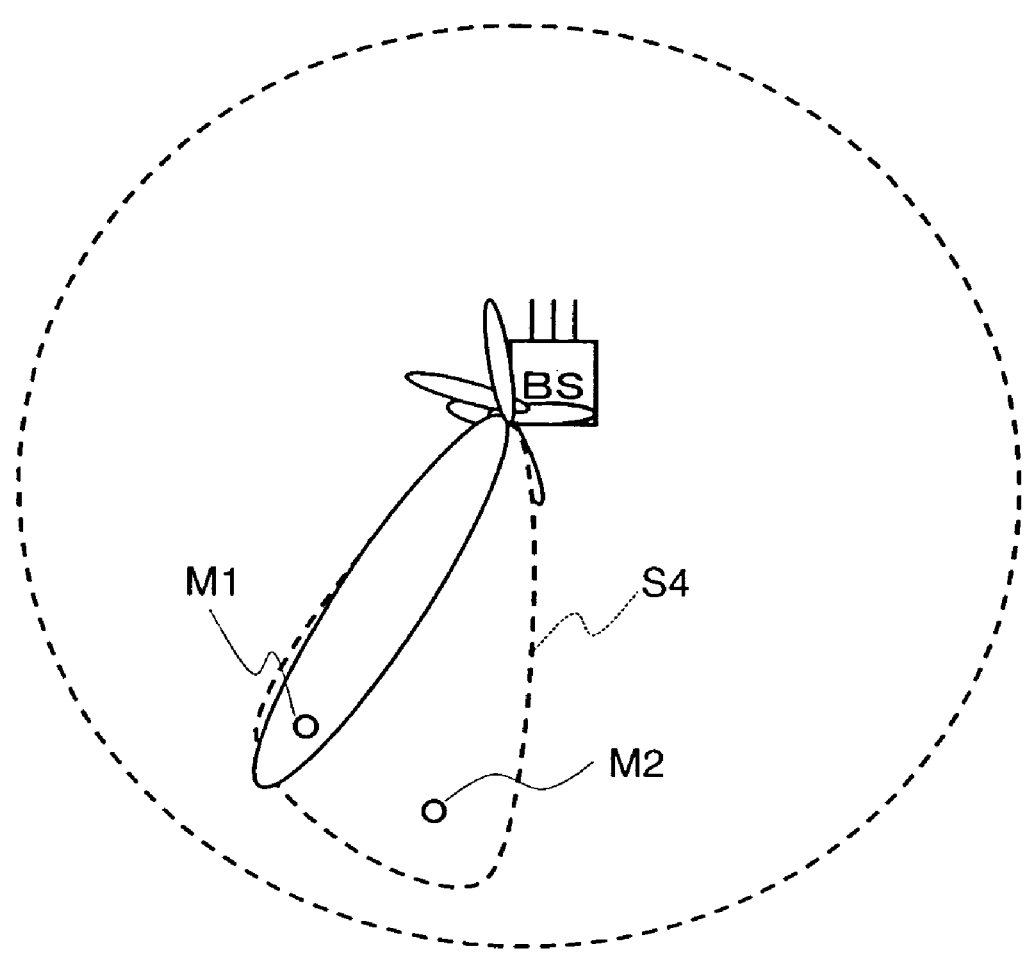
FIG. 4 is a beam waveform diagram useful in describing an instance where a mobile station wishing to receive multicast data appears at a later time.

In an instance where the mobile station M1 receiving the multicast data is already inside the cell and the other mobile station M2 then issues a multicast data request anew, as illustrated in FIG. 4, a signal beam S4 that covers the mobile station M2 that subsequently requested the multicast data is formed by the adaptive array antenna 14, whereby the aforesaid multicast data is sent simultaneously to all mobile stations M1, M2 desiring the multicast data.

The adaptive array antenna 14 will be described in detail with reference to FIG. 5.

Figure 5:
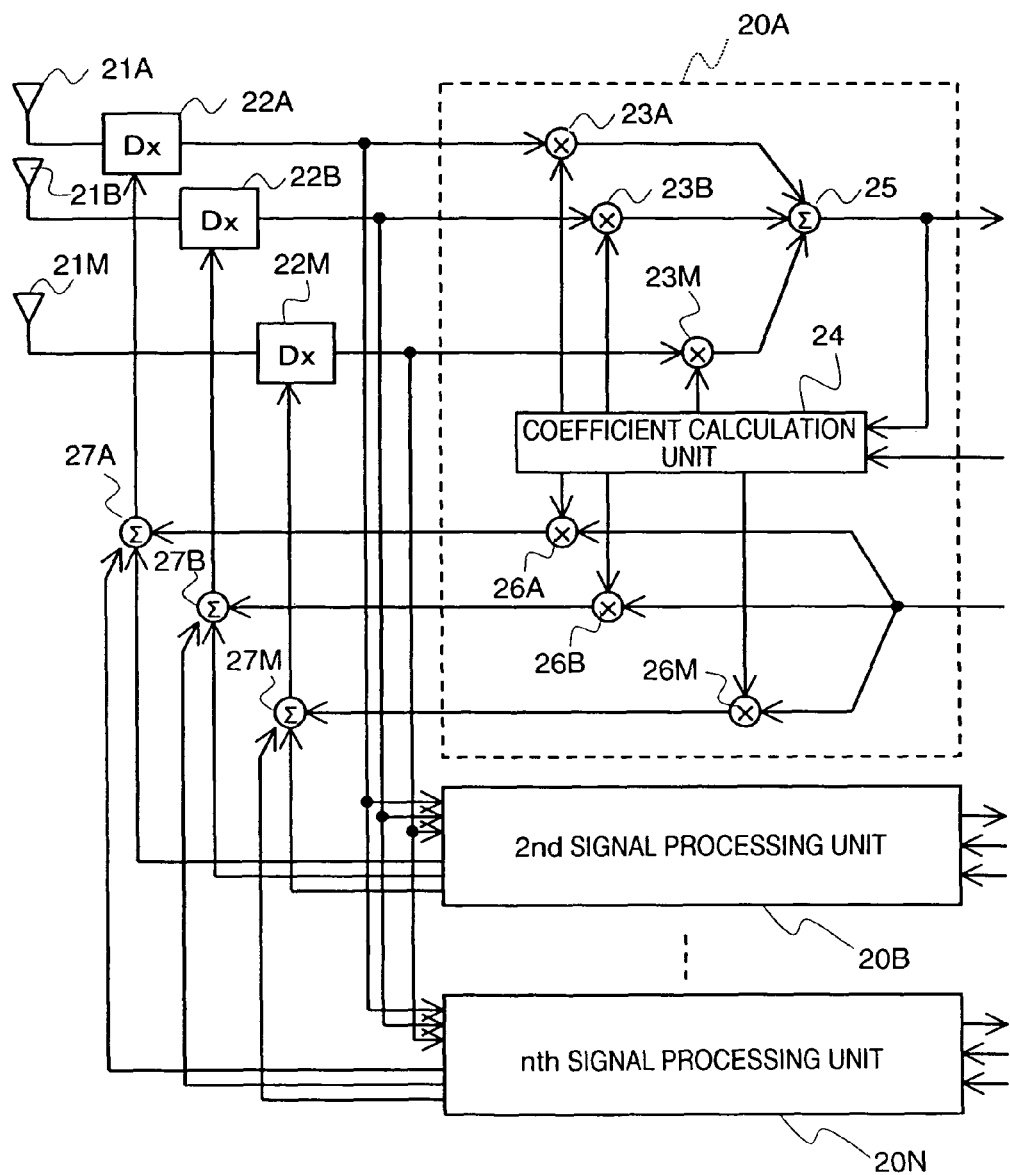
FIG. 5 is a block diagram showing the construction of an adaptive array antenna.
Figure 7:
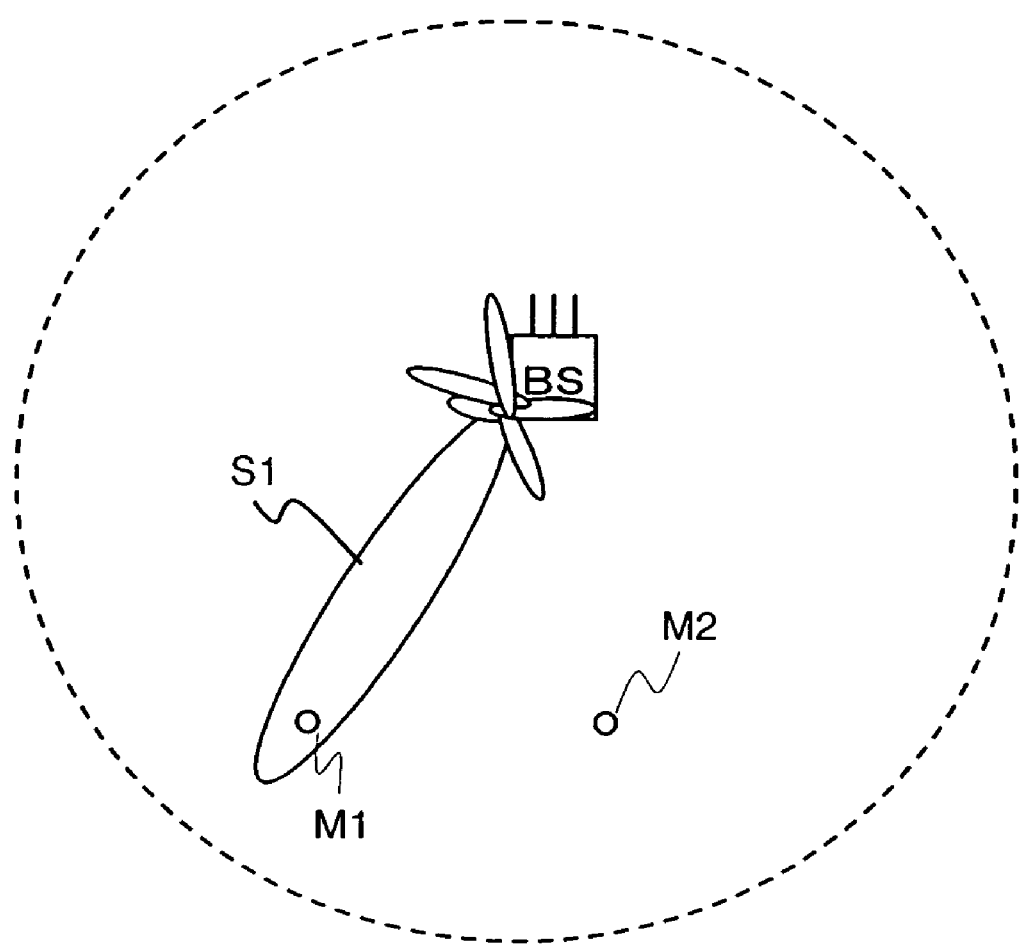
FIG. 7 is a beam waveform diagram useful in describing an adaptive array antenna.

As shown in FIG. 5, the adaptive array antenna 14 has a plurality of signal processing units 20A to 20N conforming to the number of communication channels. These signal processing units 20A to 20N process the signals of the respective communication channels.

First, at the time of individual communication, signals received by a plurality of antenna elements 21A to 21M enter the signal processing units 20A to 20N via antenna couplers 22A to 22M, respectively. Each of the signal processing units 20A to 20N includes multipliers 23A to 23M to which respective ones of the received signals are input, a coefficient calculation unit 24 which supplies coefficients $(\gamma'_1, \theta'_1)$ to $(\gamma'_M, \theta'_M)$ by which the received signals are multiplied, and a vector adder 25 for adding the products obtained from the multipliers.

Among the coefficients $(\gamma'_1, \theta'_1)$ to $(\gamma'_M, \theta'_M)$ output by the coefficient calculation unit 24, the coefficients $\gamma'_1$ to $\gamma'_M$ are for adjusting the amplitudes of the respective received signals, and the coefficients $\theta'_1$ to $\theta'_M$ are for adjusting the phases of the respective received signals.

The coefficient calculation unit 24 accepts the combined received signal output by the vector adder 25 and performs' control so as to maximize the combined received signal by adjusting the coefficients $(\gamma'_1, \theta'_1)$ to $(\gamma'_M, \theta'_M)$ while monitoring the combined received signal. Maximization of the combined received signal indicates that the directivity pattern of the antenna is directed toward the mobile station that is the object of reception. Combined received signals thus maximized by such control in the 1st through nth signal processing units 20A to 20N are output to the corresponding 1st through nth receivers 8A-8N, respectively.

Meanwhile, transmission signals that have been output by the 1st through nth transmitters 7A to 7N are output to the corresponding 1st through nth signal processing units 20A to 20N. Each of the signal processing units 20A to 20N includes multipliers 26A to 26M to which respective ones of the transmission signals are input. The coefficient calculation unit 24 supplies coefficients $(\gamma_1, \theta_1)$ to $(\gamma_M, \theta_M)$ by which the transmission signals are multiplied, after which the products obtained from the multipliers are supplied to adders 27A to 27M, respectively, the outputs of which are supplied to the antennas 21A to 21M via the antenna couplers 22A to 22M, respectively.

The coefficients $\gamma_1$ to $\gamma_M$ similarly are for adjusting the amplitudes of the respective transmission signals, and the coefficients $\theta_1$ to $\theta_M$ are for adjusting the phases of the respective transmission signals. Though the coefficients $(\gamma'_1, \theta'_1)$ to $(\gamma'_M, \theta'_M)$ calculated at the time of reception may be used as is as the coefficients $(\gamma_1, \theta_1)$ to $(\gamma_M, \theta_M)$, it is preferred that the coefficients $(\gamma_1, \theta_1)$ to $(\gamma_M, \theta_M)$ be obtained by correcting the coefficients $(\gamma'_1, \theta'_1)$ to $(\gamma'_M, \theta'_M)$ calculated at the time of reception. The reason for this is that if the transmitting frequency and receiving frequency differ, there is the possibility that the characteristics will differ slightly. In any case, since the transmitting pattern and the receiving pattern of the antenna generally are considered to be the same, the directivity pattern of the antenna will be directed toward the mobile station that is the object of transmission if the coefficients $(\gamma_1, \theta_1)$ to $(\gamma_M, \theta_M)$ based upon the coefficients $\gamma'_1, \theta'_1)$ to $(\gamma'_M, \theta'_M)$ are used.

When a multicast data transmission is made, on the other hand, the signal processing units 20A to 20N receive multicast data request commands from each of the mobile stations and first calculate, for every mobile station, coefficients $(\gamma'_1, \theta'_1)$ to $(\gamma'_M, \theta'_M)$ for reception purposes based upon the received signals. Once the coefficients $(\gamma'_1, \theta'_1)$ to $(\gamma'_M, \theta'_M)$ of every mobile station have been reported to the controller 10, the coefficients are communicated via the controller 10 to the signal processing unit that will take charge of transmission of the multicast data. Assume here that the signal processing unit 20A corresponds to this signal processing unit.

On the basis of the coefficients $(\gamma'_1, \theta'_1)$ to $(\gamma'_M, \theta'_M)$ of every mobile station, the coefficient calculation unit 24 of the signal processing unit 20A calculates coefficients $(\gamma_1, \theta_1)$ to $(\gamma_M, \theta_M)$, which are for transmission purposes, in such a manner that a plurality of mobile stations desiring multicast data will be encompassed simultaneously by a single signal beam. The coefficients $(\gamma_1, \theta_1)$ to $(\gamma_M, \theta_M)$ are supplied to the multipliers 26A to 26M, which proceed to multiply the multicast data transmission signals by these coefficients.

The transmission signals thus adjusted in phase and amplitude owing to multiplication by the coefficients $(\gamma_1, \theta_1)$ to $(\gamma_M, \theta_M)$ are supplied to the antenna elements 21A to 21M via the adders 27A to 27M and antenna couplers 22A to 22M, respectively, whereupon the transmission signals are combined to form a signal beam that encompasses the plurality of mobile stations M1, M2 simultaneously, as shown in FIGS. 6A to 6C. As a result, multicast data can be transmitted simultaneously to the plurality of mobile stations M1, M2 desiring the multicast data.

Thus, at the time of individual transmission, the adaptive array antenna 14 calculates coefficients $(\gamma_1, \theta_1)$ to $(\gamma_M, \theta_M)$ that will point the signal beam solely toward the mobile station of the communicating party and sends a signal solely to this mobile station of the communicating party. At the time of multicast data transmission, on the other hand, the adaptive array antenna 14 calculates coefficients $(\gamma_1, \theta_1)$ to $(\gamma_M, \theta_M)$ that will cause a plurality of mobile stations requesting multicast data to be covered by one signal beam and sends the multicast data to these plurality of mobile stations simultaneously.

The arrangement described above is such that if multicast data is transmitted, the mobile radiotelephone system 1 calculates the coefficients $(\gamma_1, \theta_1)$ to $(\gamma_M, \theta_M)$ based upon received signals prevailing when multicast data request commands are received, multiplies the transmission signals by these coefficients $(\gamma_1, \theta_1)$ to $(\gamma_M, \theta_M)$ and transmits the respective signals obtained as a result to the plurality of antennas 21A to 21M. When the transmission signals thus adjusted in amplitude and phase are output to the plurality of antennas 21A to 21M, the transmission signals are combined and a signal beam pointing in a prescribed direction is formed.

When multicast data is transmitted in the mobile radiotelephone system 1, the system calculates the coefficients $(\gamma_1, \theta_1)$ to $(\gamma_M, \theta_M)$ that will cause the plurality of mobile stations requesting multicast data to be covered by one signal beam. Consequently, the signal beam of the multicast data output by the adaptive array antenna 14 covers a plurality of base stations desiring the multicast data, as illustrated in FIG. 3, and the multicast data can be transmitted simultaneously to the plurality of mobile stations efficiently as a result. Furthermore, since the multicast data is capable of being transmitted to the plurality of mobile stations at one time, transmission power is reduced compared with the transmission power needed when transmitting multicast data individually. The result is a reduction in interfering waves within the cell. Moreover, since interference within the cell can be reduced, it is possible to increase system capacity.

In accordance with the arrangement set forth above, transmission of multicast data is carried out by forming a signal beam that will simultaneously encompass a plurality of mobile stations desiring the multicast data and sending the multicast data over this beam. As a result, multicast data can be transmitted to a plurality of mobile stations at the same time, the multicast data can be transmitted efficiently and interference within the cell can be reduced.

The above-described embodiment relates to a case where multicast data is acquired via the PSTN 6. However, the present invention is not limited to this arrangement. By way of example, the mobile services switching center 2 may be provided with input means and the multicast data may be entered via this input means.

Further, the above-described embodiment relates to a case where the coefficients $(\gamma_1,\theta_1)$ to $(\gamma_M,\theta_M)$ are calculated based upon a received signal that prevailed when a multicast data request command was received. However, the present invention is not limited to such an arrangement, for it is permissible to calculate the coefficients $(\gamma_1,\theta_1)$ to $(\gamma_M,\theta_M)$ based upon another received signal sent from a mobile station, such as a received signal prevailing at the time of individual communication. Still another feasible arrangement is to provide a mobile station with a receiving device used in a GPS system, communicate mobile-station position information, which has been computed by this receiving device, to the base station, calculate coefficients based upon this position information representing the mobile station, and form a signal beam that will cover a plurality of mobile stations.

Further, the above-described embodiment relates to a case where the present invention is applied to a communication system with a CDMA communications scheme. However, the present invention is not limited to such application but can be adapted so as to be applicable to any wireless communications systems such as a TDMA and FDMA system.

Further, the above-described embodiment relates to a case where the present invention is applied to the mobile radio-telephone system 1. However, the present invention is not limited to such application but can be adapted so as to be applicable to a wireless LAN system or other wireless system. What is essential is that in a case where identical information is transmitted to a plurality of mobile stations in a wireless communications system, in which radio links are established between a base station and a plurality of mobile stations by predetermined wireless communication technique, and of which base station communicates by forming a signal beam substantially in the direction to certain one mobile station to which a base station communicates with, effects similar to those realized in such case will be obtained if a signal beam that covers the plurality of mobile stations simultaneously is formed and the information is transmitted by means of this signal beam.

Further, though an adaptive array antenna is used in the foregoing embodiment, any other means and methods may be used as long as directivity can be controlled.

The present invention is advantageous in that information can be sent to plurality of mobile stations simultaneously by so arranging it that the information is transmitted to the plurality of base stations by forming such a signal beam that will cover the plurality of base stations simultaneously. This makes it possible to send information in a highly efficient. In addition, because transmission power can be reduced, interference acting upon other mobile stations can be suppressed.

As many apparently widely different embodiments of the present invention can be made without departing from the spirit and scope thereof, it is to be understood that the invention is not limited to the specific embodiments thereof except as defined in the appended claims.

What is claimed is:

1. A method of broadcasting information to mobile stations within a wireless telecommunications system, wherein said system includes a radio base station having an adaptive array antenna having a plurality of antenna elements, said method comprising the steps of:
   determining the geographic position of a plurality of mobile stations subscribed to receive certain broadcast information;
   generating a multicast data transmission signal including said broadcast information; and
   feeding said multicast data transmission signal to each of said plurality of antenna elements of said adaptive array antenna, wherein the amplitude and phase of said signal delivered to each of said plurality of antenna elements is adjusted as a function of said geographic position of said plurality of mobile stations, whereby a signal beam is formed having a beam width sufficient to cover only the area substantially bounded by the geographic locations of said plurality of mobile stations.

2. The method of claim 1, wherein said step of determining the geographic position of said plurality of mobile stations is performed for each of said mobile stations in response to receiving a signal from a mobile station requesting receipt of said broadcast information.

3. The method of claim 1, wherein said amplitude and phase of said signal delivered to each of said plurality of antenna elements are a function of a signal received from each of said plurality of mobile stations.

4. The method of claim 3, wherein said signal received from each of said plurality of mobile stations comprises data identifying the geographic position of said mobile station.

5. The method of claim 4, wherein said data identifying said geographic position is obtained by said mobile station from a Global Positioning System (GPS) satellite.

6. A system for broadcasting information to mobile stations within a wireless telecommunications network, wherein said network includes a radio base station having an adaptive array antenna having a plurality of antenna elements, said system comprising:
   means for determining the geographic position of a plurality of mobile stations subscribed to receive certain broadcast information;
   means for generating a multicast data transmission signal including said broadcast information; and
   means for feeding said multicast data transmission signal to each of said plurality of antenna elements of said adaptive array antenna, wherein the amplitude and phase of said signal delivered to each of said plurality of antenna elements is adjusted as a function of said geographic position of said plurality of mobile stations, whereby a signal beam is formed having a beam width sufficient to cover only the area substantially bounded by the geographic locations of said plurality of mobile stations.

7. The system of claim 6, wherein said means for determining the geographic position of said plurality of mobile stations determines said position for each of said mobile stations in response to receiving a signal from a mobile station requesting receipt of said broadcast information.

8. The system of claim 6, wherein said amplitude and phase of said signal delivered to each of said plurality of antenna elements are a function of a signal received from each of said plurality of mobile stations.

9. The system of claim 8, wherein said signal received from each of said plurality of mobile stations comprises data identifying the geographic position of said mobile station.

10. The system of claim 9, wherein said data identifying said geographic position is obtained by said mobile station from a Global Positioning System (GPS) satellite.

* * * * *